May 1, 1928.

Re. 16,954

L. A. COCKLIN

LIQUID FUEL BURNER

Original Filed April 27, 1925

Inventor
Lewis A. Cocklin

By
D. O. Bansell

Attorney

Reissued May 1, 1928.

Re. 16,954

UNITED STATES PATENT OFFICE.

LEWIS A. COCKLIN, OF GRISWOLD, IOWA.

LIQUID-FUEL BURNER.

Original No. 1,572,883, dated February 16, 1926, Serial No. 26,035, filed April 27, 1925. Application for reissue filed July 20, 1927. Serial No. 207,282.

This invention relates to oil burners and more particularly to that class of burners of liquid fuel for use in furnaces and stoves, and has for its objects, broadly, to provide a burner consisting of few and simple parts so that it may be manufactured economically, will be convenient in use, will be durable and will be effective in providing a required degree of heat for all purposes with a minimum quantity of liquid fuel.

One of the specific objects in view is to provide a burner of the class described which will effectively vaporize the fuel and burn the hydrocarbon without forming objectionable carbon deposits on the burner or parts connected therewith. Another object is to provide such a construction that a pilot light will be maintained in the burner. As a safety feature the invention includes means for the removal from the burner of any excess oil which might be conducted thereto.

With the foregoing objects in view and others to be mentioned hereinafter, the invention presents a novel and useful construction, combination and arrangement of parts as described herein and claimed, and as illustrated in the accompanying drawings, it being understood that changes in form, size, proportion of parts and minor details may be made as found to be of advantage, said changes being determined by the scope of the invention as claimed.

In the drawing:—

Figure 1:
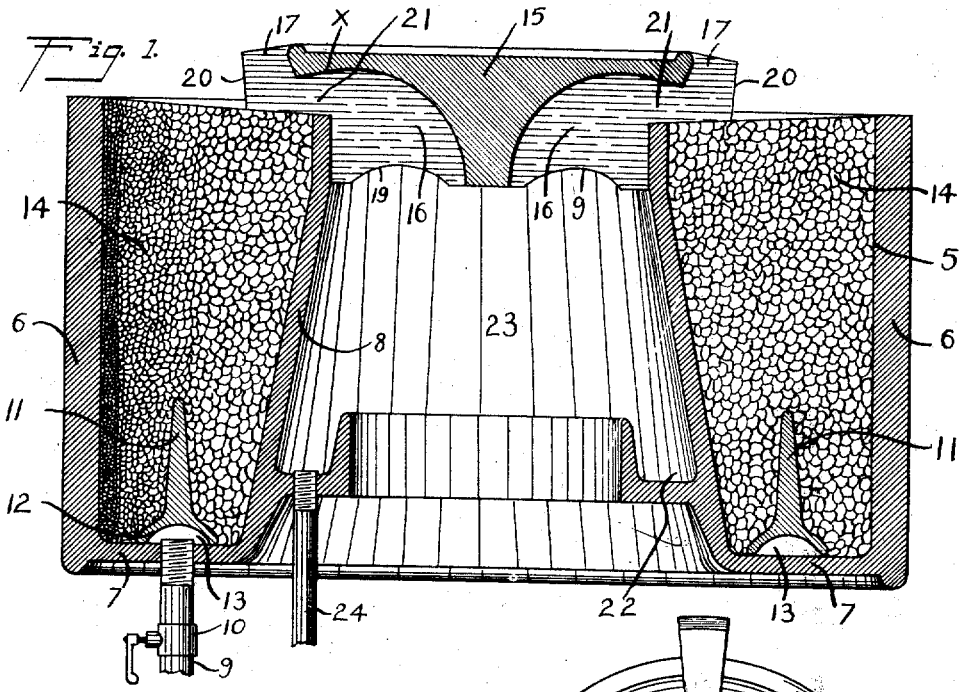
Fig. 1 is a view of the burner in longitudinal section, the section through the flame-spreader cap being on line 1—1 of Fig. 2.
Figure 2:
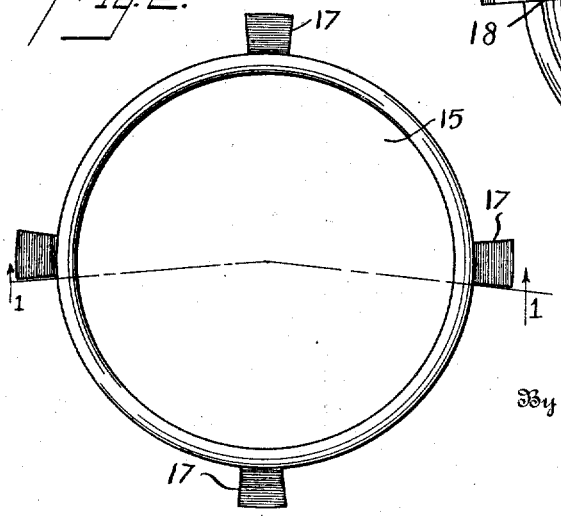
Fig. 2 is a top plan view of the flame-spreader cap.
Figure 3:
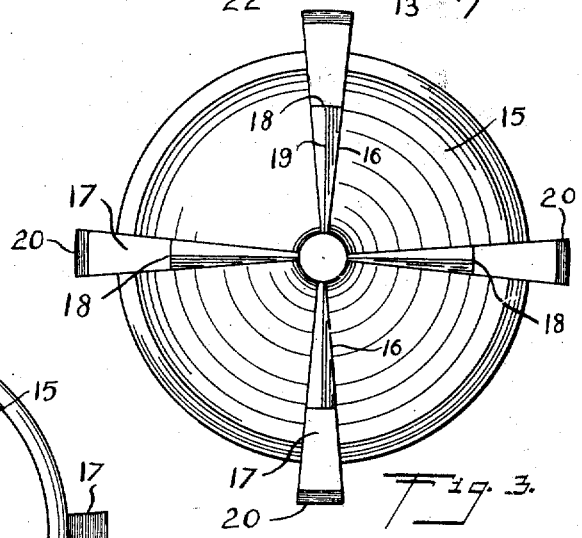
Fig. 3 is a bottom plan view of the cap.

Referring now to the drawing for a more particular description in which like reference characters indicate like parts in the several views, I provide an annular container 5, open at its top to operate as a vaporizing chamber or trough, its upright, outer, cylindrical wall being indicated at 6 and its bottom being indicated at 7, the inner annular wall 8 of said container or trough being formed upwardly convergent to provide an air passageway or flue 23.

At 9 is indicated a pipe for conducting oil or other liquid fuel from any suitable source of supply to the annular chamber 5, said pipe preferably threaded into an opening in the bottom 7 and being provided with a control valve 10. At 11 is indicated a casting operating as an oil distributor, preferably having a wall 12 of concavo-convex form and providing a conduit 13 in communication with the chamber and pipe 9.

The vaporizing chamber or the part thereof above the oil distributor is filled with any suitable material 14 which will not become injured by action of heat and will permit an upward movement of oil therethrough to the top of said chamber.

Numeral 15 indicates a spreader-cap having a diameter greater than that of the upper part of the convergent flue, said cap being provided with wings 16 having extensions 17 which project outwardly beyond the circular edge of the cap. While I have shown four of these wings, any suitable number may be used, each being provided with a shoulder 18 resting on the top of the flue.

The lowermost part of each wing 16 gradually decreases in thickness to the lower edge, and preferably the body of each wing is formed upwardly and outwardly divergent, said lowermost part having practically a "knife-edge," indicated at 19, the thickness of each wing and its extension being gradually increased upwardly and outwardly to the terminal of the extension 17, and preferably each extension has a flat bottom for engaging the top of the flue and to lie upon the top of the filler 14, each extension 17 having a terminal 20 which is inclined upwardly and outwardly to overhang a part of the filler.

In operation, oil or other liquid fuel, under pressure, may enter the conduit 13 subject to the control of the valve 10, and since the lowermost part of the concavo-convex casting 12 is somewhat rough and does not perfectly engage the bottom 7, the oil will enter the circular chamber 5 and will fill all parts thereof except the parts occupied by the filler, and will move upwardly to the top of said chamber, and when ignited the gas will burn freely.

The burning of hydrocarbon occurs at the top of the chamber 5 upon and above the surface of the filler 14. It will be noted that constricted passageways 21 are provided between the outer parts of the cap 15 and the adjacent top of the filler, the area, in plan, of the flue being greatly in excess of the passageways 21; also it will be understood that the air moving through the flue will be greatly expanded on account of its exposure to the heated material in the chamber 5, and therefore the air will move freely and with a certain degree of force through the passageways 21 to become mixed with the hydrocarbon, no blower or similar device being required to forcibly move the air as an aid to combustion.

By referring to Fig. 1 it will be seen that the lower part of the cap 15, between the wings, is substantially conical and presents concave faces, its outer parts having a downward inclination, indicated at *x*, toward the top of the filler, this being of advantage for deflecting the air and causing it to move toward the surface of the filler as an aid in effecting a thorough mixing of the heated air with the hydrocarbon. The concave cap arches over the upper edge of the inner wall of the receptacle and terminates at a point adjacent the inner wall but between the inner and outer walls forming a constricted passage for the air flowing upward through the flue formed by the inner wall of the receptacle. The cap projects outwardly beyond the outer face of the inner wall a distance less than the vertical width of the constricted passage and the relative arrangement of the concave lower face of the cap is such that the air passing upwardly through the flue 23 will be directed impingingly toward the surface of the filler 14.

As shown in the drawing, the wall 8 of the flue is of lesser height than the wall 6; also a secondary trough or conduit 22 is provided in the flue 23, said conduit being of annular form and provided with a waste-pipe 24, this arrangement of parts operating as a safety feature, since through inadvertence or otherwise an excess quantity of liquid fuel might enter and overflow the chamber 5, and any excess of liquid fuel, on account of the construction described, will move downwardly on the inner wall of the flue, by action of gravity, to the trough or conduit 22, and through the pipe 24 to a suitable reservoir or container (not shown). In the practice of the invention, however, a correct adjustment of the valve 10 is depended upon to prevent an overflow or excess supply of oil to the chamber 5. The specific construction of the inner wall of the receptacle which terminates below the horizontal plane of the upper edge of the outer wall causes the overflowing fuel to be cooled below the point of ignition whereas overflow at the outer wall would spread into the combustion chamber of the furnace and cause uncontrolled combustion therein, with probably insufficient air supply, and result in smoke, soot, stoppage of furnace flues, chimneys, and other undesirable effects.

It will be appreciated that the liquid fuel should be delivered uniformly to all parts of the chamber 5 and to the top of the filler 14, and this is provided by the present construction. In preparing the material for the filler care is exercised so that it will be of uniform consistency, and while the distributing conduit 13 is useful in some instances I may dispense with its use depending upon the kind of liquid fuel used; also in some instances I may use an annular casting 11 with its annular conduit for distributing the liquid fuel, or, as is obvious, the burner would be operative if the casting and its conduit 13 did not entirely surround the flue, and I do not wish to limit myself to the use of an annular distributor or conduit 13.

Relative to the function of the inclined facets or terminals 20 of the wing extensions, it will be understood that while air may move outwardly from the flue through the constricted passageways with considerable velocity, the air will move with less velocity at said terminals 20 than at the sides of the extensions 17, said wings and their extensions being formed outwardly divergent so that these terminals 20 operate as air pockets and are not exposed to air drafts, also the extensions 17 engage the filler 14, the result being that ignition of hydrocarbon will continue at said terminals to operate as pilot lights after the usual burning at the top of the filler ceases, this being a feature of convenience in operation. On account of this construction the valve 10 may be adjusted to provide a very limited supply of liquid fuel to the chamber 5 when heat is not needed, said supply being sufficient to maintain the pilot light for an extended period or as long as desired, to ignite the burner when a normal supply of liquid fuel is fed to the burner for heating purposes. Also, in operation, if the valve 10 is entirely closed, the pilot lights will be maintained for a considerable time.

While, as a safety feature, I have shown the secondary trough 22 for receiving any excess of liquid fuel from the top of the filler 14, and have shown a difference in the height of the walls 6 and 8 to co-operate with the trough 22 for this purpose, I do not wish to limit myself to this specific construction, as other means could be substituted for the removal of excess oil, but the means for this purpose is preferred for the reason that it is effective and certain in operation, and by its use a desired inclination for the upper surface of the filler is provided, this inclination being a feature of advantage for directing the flame upwardly as well as outwardly from the axis of the burner.

What is claimed is:

1. In a burner, an upright annular chamber open at its top and having its inner wall forming a flue for the upward passage of air, a granular filler in said chamber, means for conducting liquid fuel to said chamber, means located below the upper edge of the inner wall for catching overflow from the same and a spreader cap above said flue and having a concave lower face and projecting outwardly slightly beyond the inner wall of the receptacle and forming a constricted passage for the air at a point between the inner and outer walls and adjacent the inner wall, the relative arrangement of the cap and the receptacle directing the air impingingly towards the filler.

2. In a burner, an upright annular chamber open at its top and comprising an outer vertical wall and an inner wall spaced from the outer wall and terminating at its upper edge in a plane below the upper edge of the outer wall to cause any surplus fuel to overflow at the inner wall, a granular filler in said chamber, means for conducting liquid fuel to the said chamber, means located below the upper edge of the inner wall for catching overflow from the same, and a spreader cap above said flue and having a concave lower face and projecting outwardly slightly beyond the inner wall of the receptacle and forming a constricted passage for the air at a point between the inner and outer walls and adjacent the inner wall, the relative arrangement of the cap and the receptacle directing the air impingingly towards the filler.

3. In a burner, an upright annular chamber open at the top and having spaced inner and outer walls, the inner wall terminating below the horizontal plane of the upper edge of the outer wall for causing any surplus liquid fuel to overflow at the inner wall, a granular filler in said chamber, means for conducting liquid fuel to said chamber, means located below the upper edge of the inner wall for catching the overflow, and a spreader cap having a concave lower face and extending over the upper edge of the inner wall and terminating adjacent the same and forming a constricted passage at a point between the inner and outer walls, the relative arrangement of the cap and the inner wall operating to direct the air impingingly towards the filler.

4. In a burner, an upright annular chamber open at the top and having inner and outer walls, the inner wall terminating below the plane of the upper edge of the outer wall and forming a flue, a granular filler in said chamber, a spreader cap above said flue providing a constricted passageway between the cap and the chamber, a pipe for conducting liquid fuel to said chamber, and an oil distributor arranged within the chamber and provided with an oil passage communicating with the said pipe.

5. In a burner, an upright annular chamber open at the top and having inner and outer walls, the inner wall terminating below the plane of the upper edge of the outer wall and forming a flue, a granular filler in said chamber, a spreader cap above said flue providing a constricted passageway between the cap and the chamber, a pipe for conducting liquid fuel to said chamber, and a liquid distributing element arranged within the chamber at the bottom thereof and co-operating therewith to form an oil passage communicating with the said pipe.

6. A burner comprising an upright annular chamber open at its top and having its inner wall extending upwardly to provide a flue, a porous filler in the chamber, a spreader cap above the flue, a pipe communicating with the chamber at the bottom thereof for conducting liquid fuel to said chamber, and a member between the filler and bottom of the chamber for distributing liquid fuel to said filler, said inner wall of said chamber having a lesser height than the outer wall to insure overflow on the inside.

7. In a burner, an upright annular chamber open at the top, the inner wall being inclined inwardly and upwardly relative to its opposite upright wall to provide a flue for a movement of air therethrough, a porous filler in said chamber, a spreader cap above said flue providing a constricted passageway between said cap and said chamber, and a pipe for conducting liquid fuel to said chamber, the inner wall of said chamber having a lesser height than the height of its outer wall to permit an excess of liquid fuel to flow from said chamber over the inner wall thereof.

8. In a liquid fuel burner, an upright receptacle open at its top having a cylindrical outer wall and an upwardly tapered inner wall providing an annular chamber and a flue, a porous filler in said chamber, a liquid supply element communicating with the chamber, and a spreader cap having its bottom provided with radially arranged wings and disposed in said flue, each wing being in engagement with the said inner wall, the side walls of each wing being formed outwardly divergent to their outer ends.

9. In a liquid fuel burner, an upright annular chamber open at its top, its inner wall providing a flue, a porous filler in said chamber, and a spreader cap in said flue providing a constricted passageway between said cap and said chamber, the inner wall of said chamber having a lesser height than the height of its outer wall to permit an excess of liquid fuel to move from said chamber over the inner wall.

10. In a liquid fuel burner, an upright receptacle providing an annular chamber open at its top and an inner wall providing a flue, an annular casting having a groove opening on its bottom and removably disposed on the bottom of the chamber, a porous filler in said chamber above the casting, a pipe for conducting liquid fuel to the said groove, and a spreader cap having its bottom provided with radially arranged wings and disposed in said flue, each wing being in engagement with the said inner wall.

11. In a liquid fuel burner, an upright receptacle open at the top having a cylindrical outer wall and an upwardly tapered inner wall providing an annular chamber and a flue, an oil distributor including an annular casting having a groove opening on its bottom and removably disposed on the bottom of the chamber, a porous filler in said chamber above the casting, a liquid supply element in communication with said groove and said chamber, and a spreader cap having its bottom provided with radially arranged wings disposed in said flue, each wing being in engagement with the said inner wall and the side walls of each wing being formed outwardly divergent to the end of the wing.

12. In a liquid fuel burner, an upright receptacle providing a chamber opening at the top and forming a flue, a porous filler in said chamber, a discharge pipe communicating with the said chamber, and a spreader cap in said flue providing a constricted passageway between said cap and said filler, the inner wall of the chamber having a lesser height than the height of its outer wall to permit an excess of liquid fuel to move from said chamber over the upper edge of the inner wall.

In testimony whereof I have hereunto affixed my signature this 13th day of July, 1927.

LEWIS A. COCKLIN.